(12) United States Patent
Earle

(10) Patent No.: US 9,027,065 B2
(45) Date of Patent: *May 5, 2015

(54) METHOD AND SYSTEM FOR CREATING VIDEO CHANNELS FOR DELIVERY OF CONTENT FROM MULTIPLE PLATFORMS

(71) Applicant: aioTV, Inc., Centennial, CO (US)

(72) Inventor: Michael Everett Earle, Centennial, CO (US)

(73) Assignee: aioTV, Inc., Centennial, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/218,285

(22) Filed: Mar. 18, 2014

(65) Prior Publication Data
US 2015/0058880 A1    Feb. 26, 2015

Related U.S. Application Data

(63) Continuation of application No. 13/973,915, filed on Aug. 22, 2013.

(51) Int. Cl.
| | |
|---|---|
| H04N 7/173 | (2011.01) |
| H04N 21/2665 | (2011.01) |
| H04N 21/232 | (2011.01) |
| H04N 21/81 | (2011.01) |
| H04N 21/262 | (2011.01) |
| H04N 21/454 | (2011.01) |

(Continued)

(52) U.S. Cl.
CPC ......... *H04N 21/2665* (2013.01); *H04N 21/232* (2013.01); *H04N 21/812* (2013.01); *H04N 21/26258* (2013.01); *H04N 21/454* (2013.01); *H04N 21/47202* (2013.01); *H04N 21/2353* (2013.01); *H04N 21/2668* (2013.01); *H04N 21/4825* (2013.01)

(58) Field of Classification Search
USPC .............. 725/87, 91–92, 109–110, 114–115
See application file for complete search history.

(56) References Cited

U.S. PATENT DOCUMENTS

| | | | |
|---|---|---|---|
| 8,005,838 B2 | 8/2011 | Van Flandern et al. | |
| 8,015,580 B2 * | 9/2011 | Poling et al. | 725/39 |

(Continued)

OTHER PUBLICATIONS

"aioTV launches aioCloud and aioPro, enabling Providers to offer a branded OTT experience in 24 hours at no cost", aioTV press release posted Mar. 21, 2012, 1 page, printed from internet Jun. 26, 2013, www.aio-tv.com.

(Continued)

*Primary Examiner* — Mulugeta Mengesha
(74) *Attorney, Agent, or Firm* — Fox Rothschild LLP

(57) ABSTRACT

A system for managing delivery of content from multiple platforms maintains data for various video channels. Some of the video channels are television channels, while others are over-the-top (OTT) video content sources such as video streaming websites. The system includes a package generation module by which a service provider may define a package of both traditional and OTT channels to offer to subscribers in a unified programming interface. When a user uses the interface to select a set of video channels, the system compiles the set of the video channels in a subscriber package of both television and OTT channels. The system assigns a name to the subscriber package, and it stores the defined package and name, along with other information about the package, in a data storage facility for offering to a subscriber of content from the service provider.

24 Claims, 10 Drawing Sheets

(51) Int. Cl.
*H04N 21/472* (2011.01)
*H04N 21/235* (2011.01)
*H04N 21/2668* (2011.01)
*H04N 21/482* (2011.01)

(56) References Cited

U.S. PATENT DOCUMENTS

| | | |
|---|---|---|
| 8,667,549 B2 | 3/2014 | Reneris |
| 2004/0117838 A1 | 6/2004 | Karaoguz et al. |
| 2005/0132409 A1 | 6/2005 | Perlman |
| 2007/0192791 A1 | 8/2007 | Sullivan et al. |
| 2009/0076898 A1* | 3/2009 | Wang et al. ............. 705/14 |
| 2009/0144768 A1 | 6/2009 | Nagaraja |
| 2009/0178089 A1 | 7/2009 | Picco et al. |
| 2010/0199312 A1 | 8/2010 | Chang et al. |
| 2011/0078734 A1 | 3/2011 | Lee |
| 2011/0246620 A1 | 10/2011 | Miller, Jr. |
| 2012/0099024 A1 | 4/2012 | Ryu et al. |
| 2012/0110621 A1 | 5/2012 | Gossweiler, III |
| 2012/0173383 A1 | 7/2012 | Badawiyeh et al. |
| 2012/0331293 A1* | 12/2012 | Ma et al. ............. 713/168 |
| 2013/0152139 A1 | 6/2013 | Davis et al. |
| 2013/0198774 A1* | 8/2013 | Massicotte et al. ............. 725/32 |
| 2013/0305274 A1* | 11/2013 | Gavita et al. ............. 725/25 |
| 2013/0305287 A1 | 11/2013 | Wong et al. |
| 2014/0052740 A1 | 2/2014 | Fleischman et al. |
| 2014/0109144 A1 | 4/2014 | Asnis et al. |
| 2014/0115633 A1* | 4/2014 | Selim et al. ............. 725/46 |
| 2014/0130099 A1* | 5/2014 | Kunisetty ............. 725/50 |

OTHER PUBLICATIONS

"Fan TV is a moonshot to fix the TV Experience", CNET Reviews, May 30, 2013, 3 pages, printed from internet Jun. 26, 2013.

Snider, "Fan TV aims to put all viewing options in one remote", Jun. 1, 2013, USA Today, 1 page, printed from internet, www.usatoday.com.

G-Box Midnight, Community Portal, 2 pages, printed from internet Jun. 26, 2013, www.matricom.net/products/g-box-midnight-mx2.

* cited by examiner

METHOD AND SYSTEM FOR CREATING VIDEO CHANNELS FOR DELIVERY OF CONTENT FROM MULTIPLE PLATFORMS

RELATED APPLICATIONS AND CLAIM OF PRIORITY

This patent document is a continuation of U.S. patent application Ser. No. 13/973,915, titled "Method and System for Creating Video Channels for Delivery of Content from Multiple Platforms," filed Aug. 22, 2013.

This patent document is also related to U.S. patent application Ser. No. 13/973,887, titled "Integrated Cable and Over-The-Top Video Content Delivery System;" and U.S. patent application Ser. No. 13/973,902, titled "Method and System for Delivering Video Content from Multiple Platforms to Subscribers;" each of which was filed on Aug. 22, 2013.

This patent document is also related to U.S. patent application Ser. No. 14/218,272, titled "Integrated Cable and Over-The-Top Video Content Delivery System"; and U.S. patent application Ser. No. 14/218,262, titled "Method and System for Delivering Video Content from Multiple Platforms to Subscribers"; each of which was filed on the filing date of this application.

The disclosures of each document listed above are fully incorporated herein by reference

BACKGROUND

Consumers of on-demand video content today have an ever-growing number of content sources available to them, and they want to receive that content easily on a wide variety of devices. Content providers such as cable television service providers want to reach these consumers, but content licensing restrictions may prohibit the service providers from providing their subscribers with all content in any location on any device. Depending on the owner of the content, the provider may only be able to make the content available for on-demand viewing in certain geographic regions, via licensed devices. However, because of an inability to manage the licensing rights, cable television service providers may limit the content and/or the means of access that they make available to their subscribers. In addition, various Internet-based video sources may deliver content in a manner that is optimized for one device (such as a smart phone), but whose viewing quality is not optimal for another device (such as an Internet-connected gaming device that is connected to a high definition television). This can lead to frustration for consumers, and loss of customers by cable service providers.

This document describes improved methods and systems for delivering video content from multiple platforms to subscribers.

SUMMARY

In an embodiment, a system for managing delivery of content from multiple platforms includes a data storage facility that maintains data for various video channels. A first portion of the video channels are video content sources that are controlled by a service provider, such as broadcast or cable television channels. A second portion of the video channels are over-the-top (OTT) video content sources that are not under any control of the service provider, such as video streaming websites, social media sites or other third party sources. The system includes a package generation module by which a service provider may use a user interface to define a package of both traditional and OTT channels to offer to subscribers in a unified programming interface. The package definition interface displays data relating to the video channels. When a user selects a set of video channels from the displayed data, the system compiles the set of the video channels into a subscriber package of channels from the first portion (i.e., television) and the second portion (i.e., OTT sources). The system assigns a name to the subscriber package, and it stores the defined package and name, along with other information about the package, in a data storage facility for offering to a subscriber of content from the service provider.

In some embodiments, the service provider user interface may include channel ordering interface by which the service provider may order channels in the subscriber package. In operation, the module: may receive a request to move a first channel in the subscriber package to a new order location in the subscriber package. The system will determine whether this is permitted by identifying an adjacency rule that applies to the first channel and one or more channels that would be adjacent to the first channel if the first channel were moved to the new order location. It permits movement of the first channel to the new location only if the movement would satisfy the adjacency rule; otherwise it denies the movement. If the adjacency rule includes a requirement that a second channel remain adjacent to the first channel, it may cause the second channel to automatically move to a new position in the order along with the first channel.

Optionally, the system may include a channel definition interface by which the service provider may define a new channel or modify an existing channel. The channel definition interface receives a selection one or more sources of over-the-top video content, and for each source it associates a delivery address with a subscriber device type. The system defines one or more rules for selecting and ordering content from the one or more sources in a playlist to be presented via the new channel. When content is presented to a subscriber on the associated channel, the system offering the content to the subscriber in accordance with the defined rules and gives the user's device information so that the user's device can receive the content directly from the delivery address that is associated with the video content source.

Optionally, the system may define playlists for one or more of the channels. When defining a playlist or rules for a playlist, the user may select or provide one or more advertisement delivery rules. The advertisement delivery rule set includes instructions as to where to place one or more advertisements in the playlist and how many ads to place at any location. Examples may include "insert any two ads after playing three videos." When presenting content to a subscriber on the associated channel, the system will placing one or more advertisements in the playlist in accordance with the advertisement delivery rule set.

As an additional option, the system may use the channel definition interface to present the user with the option to choose various user-selectable filters. Each filter assigns a weight to one or more categories of content information. If the system receives a user-selected adjustment of one or more of the filters, then when it presents content to the user for selection, it may omit some content items based at least one of the user-adjusted filters.

Optionally, the system may implement a content management interface configured to enable the service provider to manage available content by receiving a user selection of a content item; retrieving metadata associated with the content item, wherein the metadata includes a title and a delivery address; receiving descriptive information of the content item; and saving the metadata and descriptive information as a record of the content item.

In addition, the content management interface may enable the service provider to periodically update available content by receiving a user selection of a video source; receiving a rule set comprising a frequency; periodically accessing the video source according to the frequency to determine whether the video source has posted any new content since a prior time that the processor accessed the video source; retrieving metadata for the new content, wherein the metadata comprises a title and a delivery address; and storing the metadata in a content data storage facility. If the video source corresponds to a playlist, the system may store the metadata in association with the playlist. For example, if the video source corresponds to a social media feed for a subscriber, the system may periodically access the subscriber's social media feed and retrieve metadata for new posts to the subscriber's social media feed. The system may then automatically add information about the new content to a playlist that is presented to the subscriber in the package as a channel from an OTT source. Optionally, when adding information about new content to a playlist, the system may cause older content to move further down the playlist—such as to a next page of the list—or it may remove the older content entirely from the playlist.

BRIEF DESCRIPTION OF THE DRAWINGS

FIG. 7 is an example of a process flow for a video content management system.

FIG. 8 is an example of a content ingestion interface for a video content management system.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

This document describes a system that integrates video content from a cable television service provider and one or more over-the-top sources. This document uses the term "cable television service provider" to refer to a service provider that distributes multiple broadcast and subscription-based video channels to subscribers. The cable television service provider may supply the channels via radio frequency (RF) signals transmitted through a network of coaxial and/or fiber optic cables, via direct broadcast satellite transmissions, or by other delivery means. Thus, when this document uses the term "cable television service provider," it is intended to include all such subscription-based providers including traditional cable television providers, satellite television providers and the like.

An "over the top" (OTT) source is a common term used to refer to a source of video content that is not affiliated with the cable television service provider, but the service provider may facilitate access to the OTT source by its subscribers. OTT sources typically provide digital video signals via digital communication networks such as the Internet.

Figure 1:
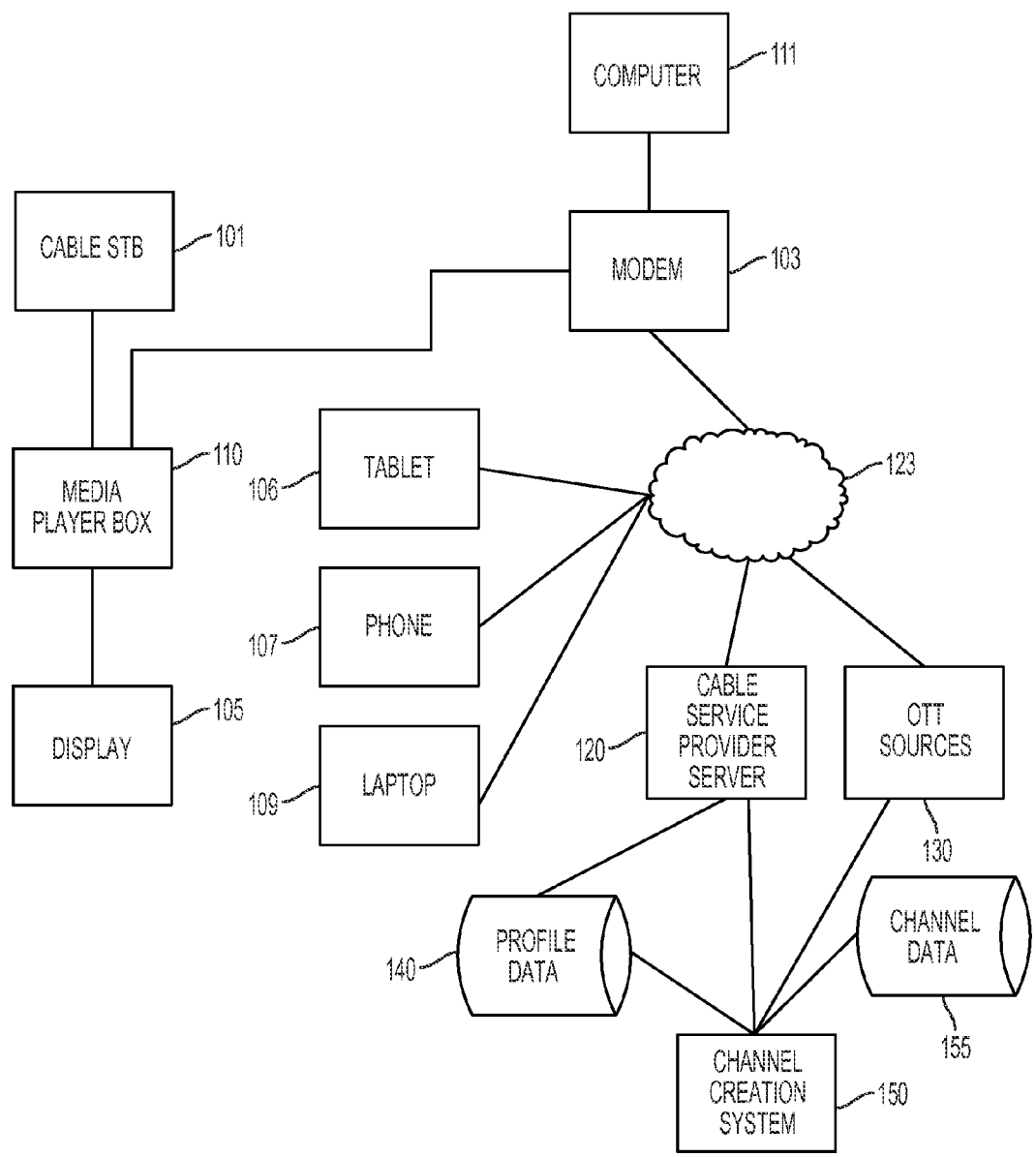
FIG. 1 is a block diagram that illustrates various elements that may be included in a multi-platform video content management and delivery system.

FIG. 1 illustrates an example of various components of a system for integrating cable and OTT content. Video content is made available to the consumer via one or more communications networks 123 such as the Internet and/or a cable television service provider network. The video content may be served by a cable service provider data server 120 and any number of OTT content sources 130 through the communications network 123.

The consumer may receive the content delivered through the networks via any number of devices. For example, the consumer may receive content via a computer 111 that is connected to the network via a modem 103 or equivalent communication interface. The consumer also may receive content served to a television or other display 105 by the cable service provider to a cable set-top box 101. The consumer also may view OTT content on the display 105, and a media player box 110 may provide the consumer with a display interface that integrates the cable service provider's content and the OTT content. In addition, the consumer may receive content via any number of wired or wireless electronic video player devices such as a tablet 106, smartphone 107, laptop computer 109 or any other video player such as a gaming machine or wireless-enabled television. Any or all of the electronic communication provided to any of the devices described above may be via a wired connection and/or a wireless connection such as a mobile phone network, wi-fi or other long range, short range or near field communications network.

The system also may include a data storage facility containing profile data 140 for one or more subscribers of a service, such as cable television service providers. The profile data 140 may include information such as subscriber authentication information that can be used to verify that a user who accesses the system is actually a subscriber, user preference information such as services and/or playlists that the user has selected to display on a television, smartphone, tablet, computer, or other content delivery device. The profile data 140 may also include subscription details for the subscriber such as authentication information or a service provider subscription confirmation token for one or more OTT sources to which the user is a subscriber. The OTT sources may be, for example, video streaming services or social media services that may or may not be affiliated with the cable system service provider. Although FIG. 1 illustrates the profile data 140 as being directly accessed by the cable service provider server 120, any or all of the profile data 140 may be additionally or alternatively stored on any of the subscriber's electronic devices and/or on any remote data storage facility.

The system also may include a channel creation system 150 comprising a processor and memory with programming instructions that enable a service provider to define various channels that subscribers may access. The channel creation system may have access to both video channel data 155 and OTT source data 130 so that the content provider can select items to include in a subscriber package. The package of available channels, and in the case of OTT sources optionally content to include within those channels, for any subscriber may be stored in the profile database 140.

Figure 2:
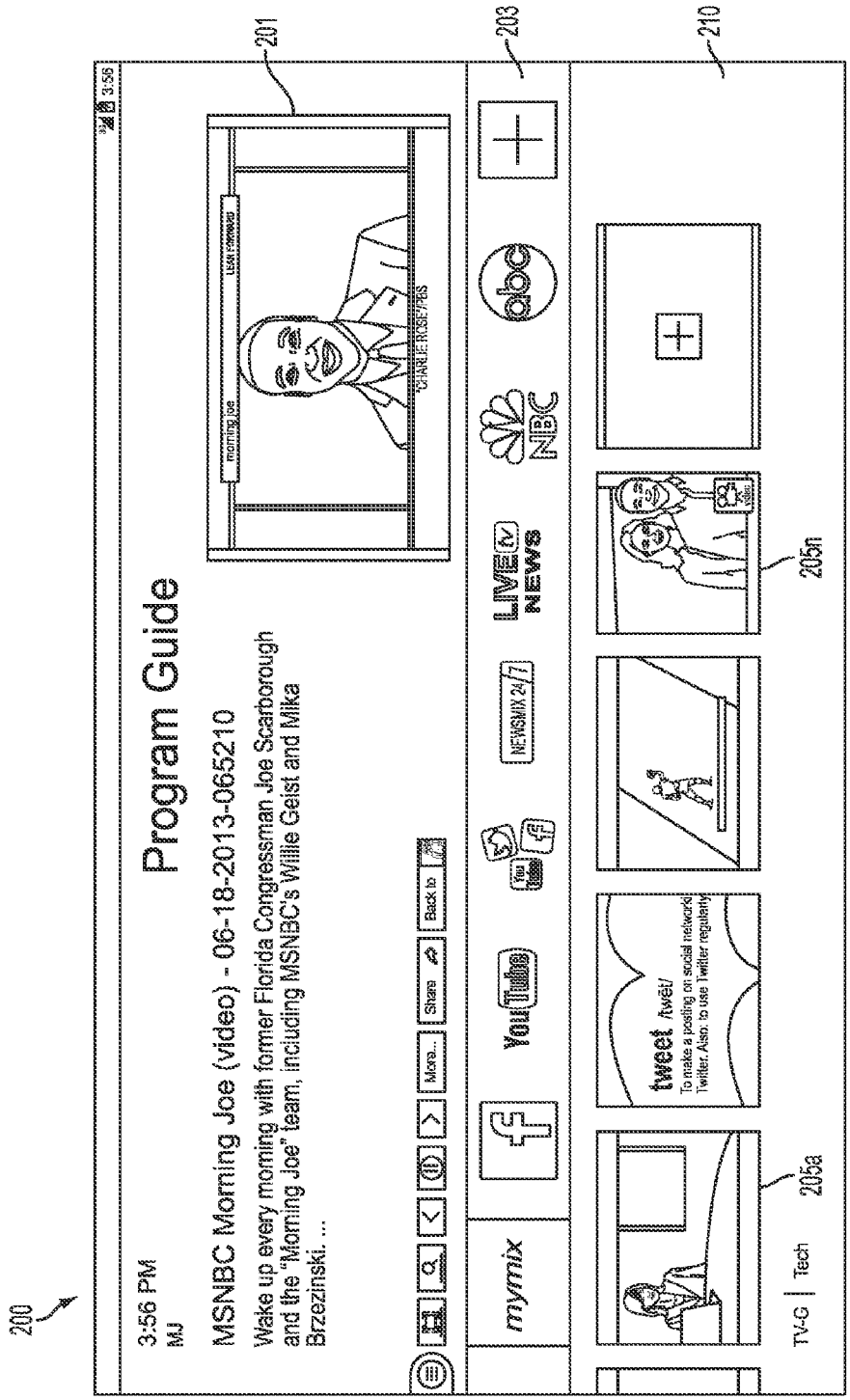
FIG. 2 illustrates an example of a programming guide screen for an integrated video content delivery system.

When a subscriber uses a television, computing device (e.g., computer, tablet or smartphone), or other authorized content delivery device to access the system, a programming guide application on the user's device and/or a remote server may cause the user's device to display a unified programming guide interface. FIG. 2 illustrates an example of a unified programming guide interface 200. A first portion of the interface is a media player 201 that displays video corresponding to a cable television channel to which the user's cable service provider set top box is set or which the cable service is serving to the user via a remote server. Alternatively, the media player may display video from an OTT source that the user has selected. If the user implements a command via the interface or via a connected set top box to change the cable channel, or if the user or selects another OTT source via the programming guide, then the media player 201 may update and display the video that is being transmitted on the newly-selected channel or received from the newly-selected OTT source. Alternatively, the media player may display a thumbnail or other fixed image or text corresponding to such content. A second portion of the interface will include a channel selector 203 that displays identifying information for a set of channels that are available for the viewer to view. The channels will include broadcast and/or subscription-based channels from the cable service provider, as well as one or more channels from OTT sources, in a seamless format that does not require the user to change the interface other than to scroll or otherwise move among the channels. The available channels may correspond to a package of channels that the cable service provider provides to the user, along with channels of OTT content that the user is permitted to access.

As the user scrolls through the available channels, the programming guide interface will also include an asset listing interface 210 that displays a set of available content on a featured one of the available channels. The featured channel whose content is displayed in the asset listing interface 210 may correspond to the channel that is in a first position in the channel selector 203, at a different standard position, or at a position corresponding to a user selection. Each OTT content asset may be associated with metadata that includes an address of an OTT source where the content asset (i.e., video) is available. When a user selects an asset from the asset listing interface, the system may use the address to identify the OTT source, and the system may retrieve the asset from the asset's corresponding OTT source or connect to an external media player that is available at the asset's corresponding delivery address, and the system may then cause the video asset to be displayed via the media player 301 or in a full screen format.

Figure 3:
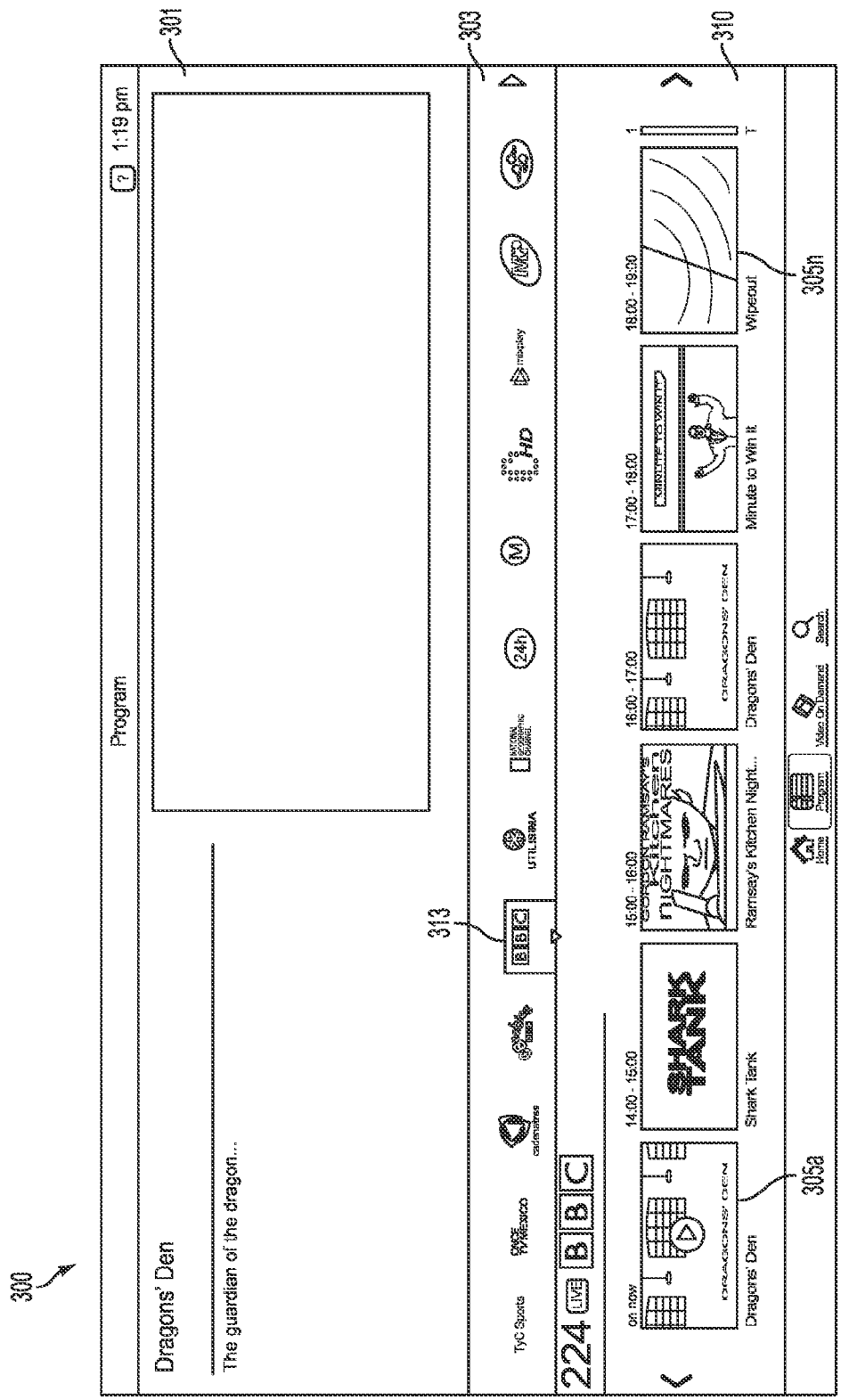
FIG. 3 illustrates an additional example of a programming guide screen for an integrated video content delivery system.

The example of FIG. 2 shows an example programming guide where the asset listing interface lists available on-demand assets 205a . . . 205n—i.e., videos—from a selected OTT source. FIG. 3 shows an embodiment of the programming guide interface 300 in which the user has selected a cable broadcast channel 313 from the channel selector 303. In this situation, when a user selects a channel 313, the asset listing interface 310 will display a menu of upcoming programs 305a . . . 305n on the selected channel in chronological order, optionally with start, stop and/or run length times. Optionally, in the asset listing interface 310, the menu listing for the program that is currently being broadcast on the selected channel may include a play input that a user may select to cause the program to be displayed via the media player 301 or in a full screen format.

A data storage facility of the system will hold data for a set of available video channels and one or more video assets that are available via the channel. Some or all of the data storage facility may be maintained on a local electronic device of a consumer, while some or all of the data storage facility may be maintained on a remote memory device, such as a cable television service provider data storage facility. Some of the video channels will be content sources that are controlled by a multi-channel video service provider, such as a cable television service provider, such as traditional broadcast and cable channels whose delivery to the consumer is part of a cable television service package. Other video channels in the set will be OTT content sources that are not under any control of the service provider, such as third party audio or video streaming services, on-demand video sharing websites, and social media sites on which members may share video content.

The system will generate and cause a display of the consumer's electronic device to display a content delivery interface, such as that illustrated in FIG. 2. To determine which channels to include in the content delivery interface, the system may determine a set of channels that are available to the consumer. The identification of these channels may be maintained by the video service provider in a user profile in the data storage facility, and/or a portion of it may be maintained in a memory of the user's electronic device. To be available to the consumer, the user's profile data may include data indicating that the user has subscribed to a package of channels, and some or all channels that are included in the package may be listed in the content delivery interface. For OTT sources, if the OTT source requires an authentication credential in order to serve videos, the system's rule set may require that the user profile data include the authentication credential. Before including the channel in the listing, the system also may send a signal to the OTT source to verify that the authentication credential is valid and will actually provide access to the videos at the OTT source. In this way, the content delivery interface will only include channels that the user is actually permitted to view, whether it be because the user has subscribed to the channels via the video service provider or because the user has subscribed to the relevant OTT service.

The consumer may use the content delivery interface to select channels for viewing on the display. The available channels may be presented in channel selector interface, such as interface 203 of FIG. 2. The channels will include some channels that are served by the multi-channel video service provider, while others channels will be served by OTT sources.

Thus, when the content delivery portion of the system receives a consumer's selection of one of the available channels, the system will access a playlist of available video assets for the channel and select a video asset to present to the consumer via the user interface. The data storage facility may include the data for available video assets on each channel. This data will not necessarily include the video assets themselves, but rather will include programming guide data describing the video asset such as title, run time and/or genre. For video assets available from OTT sources, the data will also include one or more delivery addresses where the video assets are available to be served by the OTT source. A delivery address may be, for example, an IP address where the OTT source makes the video asset available for streaming. The data storage facility also may include compatibility data, such as a file type or rights management data, that the content delivery system may use to assess whether the asset as served by the OTT source at the delivery address is compatible with the device on which the consumer is attempting to view the asset. For example, the compatibility data may include a device type, a resolution capability of the device, or an authentication credential for a user of the device.

Optionally, before the consumer selects a video asset, and before the consumer selects a channel or when the system displays a channel listing to the consumer, the system may generate or revise a playlist (i.e., a sequence of available video assets to preset on any channel) such that the playlist only includes assets that are compatible with the user's electronic device. As a precursor to or as part of generating the playlist, the system identify may available video assets on the channel to be candidates for inclusion in the playlist, while filtering any assets that are not available from any delivery address that do not serve the asset in a format that is compatible with the user's device type. The system may do this with any suitable method, such as by applying a compatibility rule to metadata for a candidate asset and identifying data for the user or the user's device. For example, the metadata for the video asset may include a file or media player type, and the compatibility rule may state that the system should only include the asset in the playlist if the user's device is able to play the file/player type. As another example, if the user's device is capable of playing videos at a certain format (such as 720p or 1080p), then if multiple sources are available the system may select the asset and delivery address that provides the asset in a format matching a format that the device is capable of playing. The device's format may be known based on system knowledge of the device, or it may be stored in the user's profile data.

Optionally, to determine whether to include a video asset in the playlist, if the system's data for a candidate video asset includes a geographic restriction, the system may determine a current location for the user's device using geographic positioning system (GPS) or equivalent data that it retrieves from the user's device, and the system may filter any candidate assets whose geographic data dues not meet the criteria of the restriction. In this way, only those assets for whom the device's current location does not violate the geographic restriction will be included in the playlist.

Before the device will actually display the video asset to the consumer, the system may identify a device type for the user's device, and it may use the device type data to determine (based on information in the data storage facility) a delivery address from which the first video asset may be served in a format that is compatible with the user's device type. The user's electronic device may then access the video as served by the determined delivery address and display the video to the user via the user interface. In this way, the video service provider can ensure that the consumer only views videos that are compatible with the consumer's device, and that OTT videos are served directly by the OTT source.

As noted above, the content provider elements of the system may include a data storage facility or facilities with data for available video content sources that are controlled by a service provider (e.g., live broadcast or cable channels), along with OTT video content sources that are not under any control of the service provider (e.g., live or on-demand video streaming sites). The channel creation system 150 may implement a package generation module and present a service provider user interface that enables the service provider user to define channels and/or packages for individual subscribers or groups of subscribers.

Figure 4:
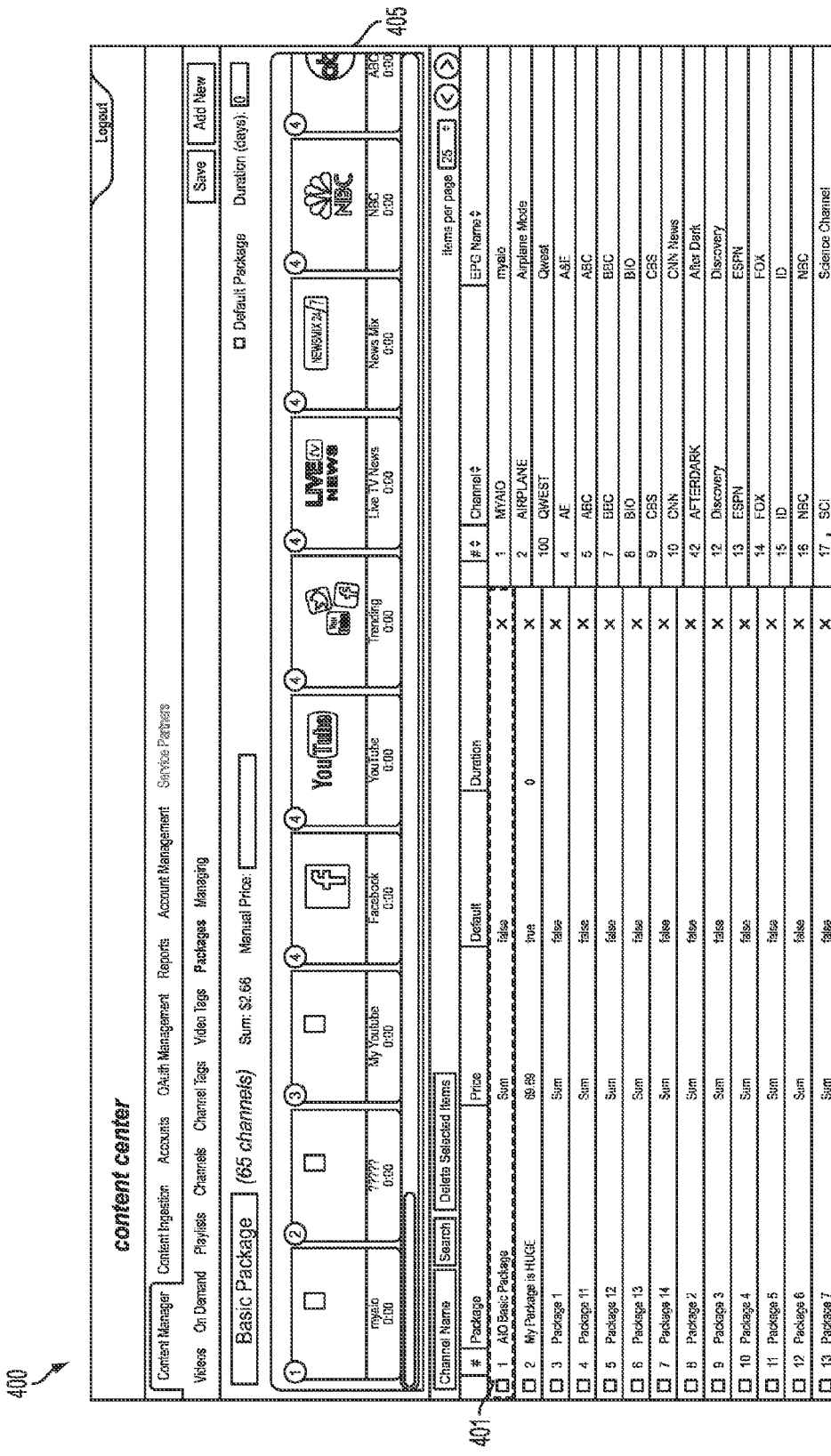
FIG. 4 illustrates an example of a channel definition interface for a video content management system.

FIG. 4 illustrates one screen of an example of a package generation module 400 that a service provider or its representatives may use to define packages of content that are available to subscribers. The module may include a package definition interface 401 via which a user may define or select a package and select channels for inclusion in the package. When the module receives a user selection or definition of a package, it may display a menu 405 of channels that are included in the package, along with a channel selector 403 that identifies channels that the user may add to or delete from the package. Optionally, the user may add channels to or delete channels from the menu 405 by dragging and dropping them from channel selector 403 to the menu 405. The package generation module also may present fields in which it may receive information such as a name for the package, a price for the package, whether or not the package should be a default package (i.e., provided to all subscribers) or an optional package (such as available to those who choose it), a duration in which the package or package price will remain available, and other information. The price for the package may include an actual price or one or more pricing rules (e.g., charge a first price for the package if the subscriber purchases the package alone, or a second price if the subscriber purchase the package plus one or more other products or services). After the user defines the channels to include in the package and the associated package information, the user may save the data defining the package to a data storage facility.

The menu 405 and/or channel selector 403 may serve as a channel ordering interface that allows the user to assign an order to channels in the package, such as by drag and drop and/or data entry methods. The order represents the sequence in which the channels are numbered, so that a subscriber who implements a "channel up" or "channel down" command on the subscriber's content delivery device will view the next channel up or down in the order. Optionally, the channel ordering interface may display the channels in a default order, according to any number of predefined rules.

When the system receives a user request to move a channel to a new order location in the package, it may access a rule set of adjacency rules. Adjacency rules may identify, for any given channel, other channels or types of channels that are permitted to be (or prohibited from being) adjacent to or within a defined number of places away from the given channel. For example, an adjacency rule for a given news channel may state that it cannot be adjacent to another news channel in a package. Adjacency rules also may include one or more conditions, caveats, or requirements. An example is a condition that a given news channel may not be adjacent to another news channel unless the other news channel is another news channel that is offered by the same content provider, in which case the other news channel may be required to be adjacent to the given news channel. The system may permit movement of a channel only if the movement would satisfy (i.e., not violate) any adjacency rule. In addition, if a user tries to move a first channel that is subject to an adjacency requirement with a second channel, then when the user moves the first channel in the ordering interface, the system may automatically cause the second channel to move in the ordering interface in accordance with the adjacency requirement.

Figure 5:
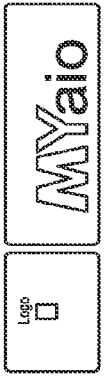
FIG. 5 illustrates an example of a playlist generation interface for a video content management system.

The service provider portion of the system also may implement a channel definition interface via which a user may define various items of OTT content to include in an OTT channel. FIG. 5 illustrates an example of an OTT channel definition interface 500. The interface may include various input fields—such as data entry fields or selectable menus, in which a user may define a name for a channel 501, descriptive information 503 about the channel such as a category or genre, an image 507 that will be displayed to represent the channel such as a thumbnail or icon, and other information 505 such as an indicator of whether or not the channel is a live channel or on-demand channel, whether or not the channel may be customized by the subscriber and a source for the channel (e.g., uniform reference locator or IP address or source ID). A channel may include multiple, device-type-specific sources that correspond to various content delivery addresses that provide content in formats that are compatible with various consumer device types. For example, an OTT source may make content available in an Apple iOS-compatible format from a first delivery address, and in an Android operating system-compatible format from a second delivery address. When the system receives this information from the user via the channel definition interface, it may save the channel data in a data storage facility for inclusion in one or more packages.

Figure 6:
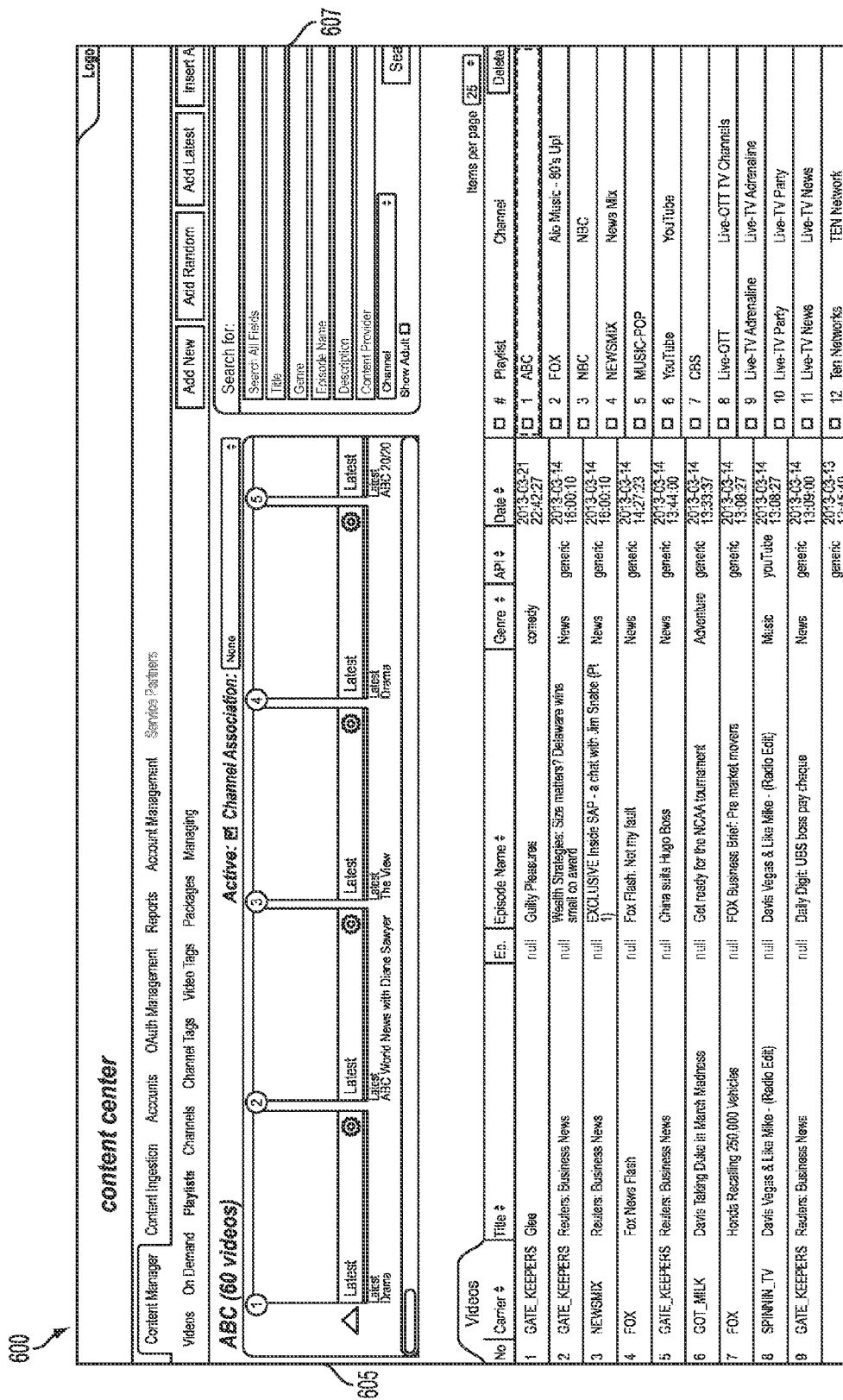
FIG. 6 illustrates an example of a content management interface for a video content management system.

In some embodiments, a channel may include a playlist of specific content that is selected from an OTT source, or from multiple OTT sources. FIG. 6 illustrates an example of an OTT playlist generation interface 600. The interface may display a source selector menu 603 via which a user may select sources of available content, and a search field 607 via which a user may search for content by keywords. The search field may allow a user to enter a search request for content that has been catalogued in a content database (described below), or it may enable the user to search for any content available from selected OTT sources or any OTT sources. The content available from the selected source or returned from the search may be displayed in a content selector menu 601 via which a user may select content for inclusion in the playlist. A playlist ordering menu 605 will display the content that the user selected in the order in which it will be presented to a subscriber when the subscriber selects the playlist.

The playlist ordering menu 605 or other portions of the playlist generation interface may allow the user to define the order in which content items will appear in the playlist, a name for the playlist, and one or more rules for the playlist. Rules may include, for example, rules specifying where the system may insert advertisements into the playlist. The user may select advertisements and insert them as content in the playlist. Alternatively, when a subscriber plays the content in the playlist, the content delivery portion of the system may automatically insert ads between content items in accordance with the advertisement placement rules. If the user has not defined advertisement placement rules, one or more default rules may apply, such as to play an ad after every third content item, or to play an ad during the first break after any fifteen minute interval of content has been played.

Optionally, the playlist generation interface also may include a function such as a randomization function in which the system may randomly select content for inclusion in any or all parts of the playlist. The user may be able to identify one or more criteria that any video content item must satisfy in order to be included in the randomly generated playlist, and if so the system may only select videos that satisfy the criteria. The interface also may include a function that retrieves the most recent known content for inclusion in the playlist. Again, the user may be able to identify one or more criteria that any video must satisfy in order to be included in a "most recent" playlist, and if so the system may only include in the playlist videos that satisfy the criteria. In either of these situations, after the system automatically generates a playlist, the user may be able to modify the playlist by adding videos, deleting videos, or changing the order of videos in the playlist.

When the playlist is generated, the system will generate a playlist record describing the user selections of content, order and rules and store that information in a data storage facility. Notably, the system need not store the content itself, as the data for each content item will include one or more delivery addresses at which a subscriber may access the content. The playlist, when played by a subscriber, merely causes the user's content delivery device to access the content from the specified delivery address in a sequential basis according to the order of the playlist.

Figure 7:
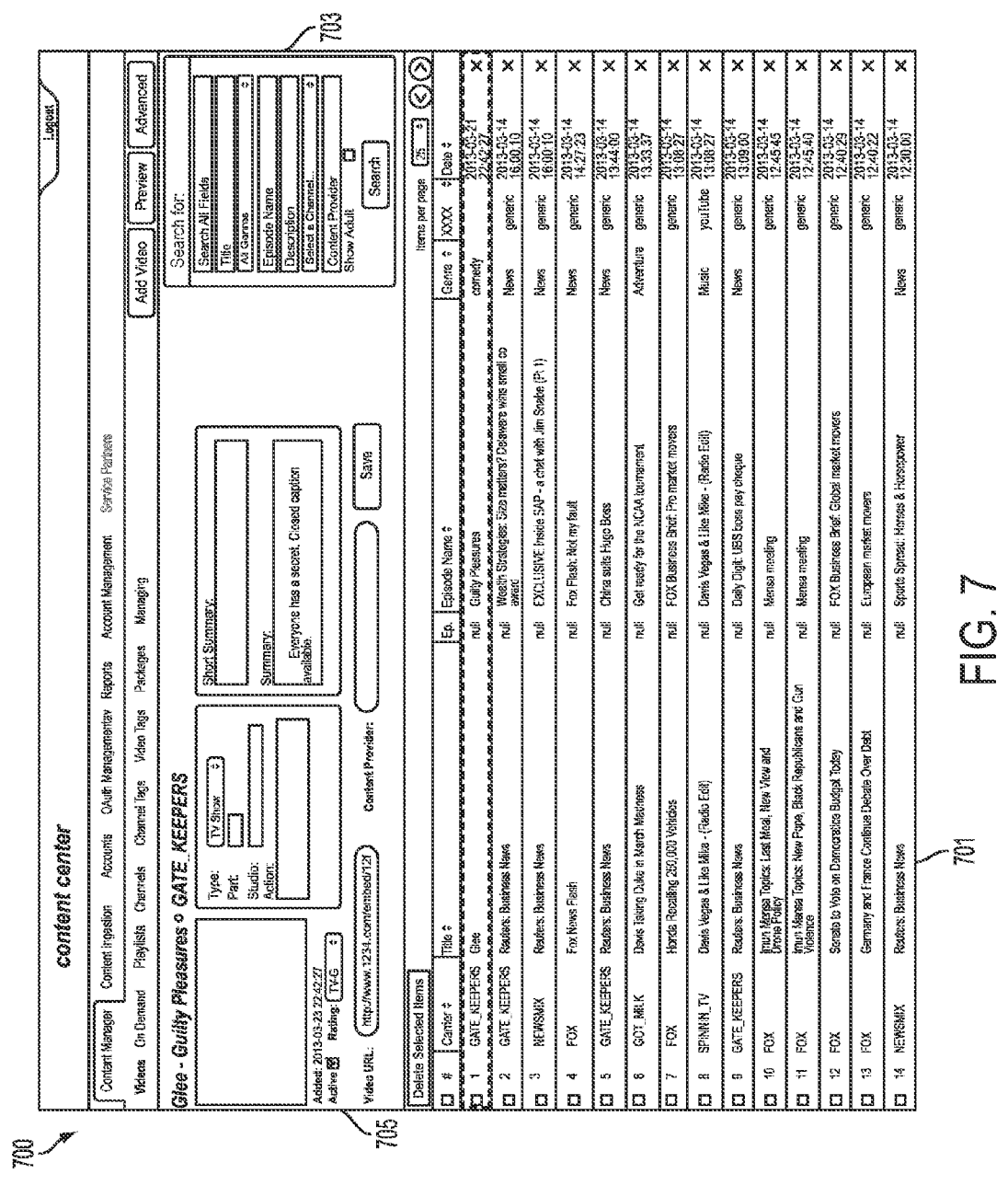

As noted above, the system may include a database in which information relating to OTT content items may be stored. The OTT content items are those for which users may receive information via one or more channels. The system may automatically receive at least some of this information from the OTT content source. Alternatively, some of the information may be added by the service provider. FIG. 7 illustrates an example of an OTT content management interface 700 through which a service provider may add information about content. The interface may include a content selection menu 701 via which a user may select content to include in one or more channels. The content selection menu 701 may list content for which the system has information in its catalog. In addition, the interface may include a search field 703 via which the user may enter criteria to search for content that is catalogued in the system's database, or which may be found via external sources. The system also many include a content description field 705 via which a user may view and/or enter information about the content. The identification menu may include (or allow a user to enter) a URL or IP address for a delivery location for the content; a title and other descriptive information (such as episode name); a genre; a rating; run time; video type; identification of one or more actors or directors; an indicator of whether the content is delivered live or on demand; and other information. The menu or another part of the interface also may allow the user to assign the content to one or more channels of the system, so that the system may then present information describing the content to subscribers of the assigned channels. When the subscriber selects a video from a playlist, the system may present any or all of this information to the user via the user's display. In addition, the system may store this information to enable the subscriber to search for content and add it to custom, subscriber-defined playlists.

Optionally, the content menu may be used to manage content as it is uploaded by one or more OTT sources. For example, if the system includes a channel that is associated with an OTT source, the system may automatically and periodically scan the source to identify when new content is available, or it may receive a notification from the source indicating that new content is available. When identified, the system may automatically add the new content to the content selection menu 701, and a user may then use the content description field 705 to add metadata for the content to be stored in the system.

Figure 8:
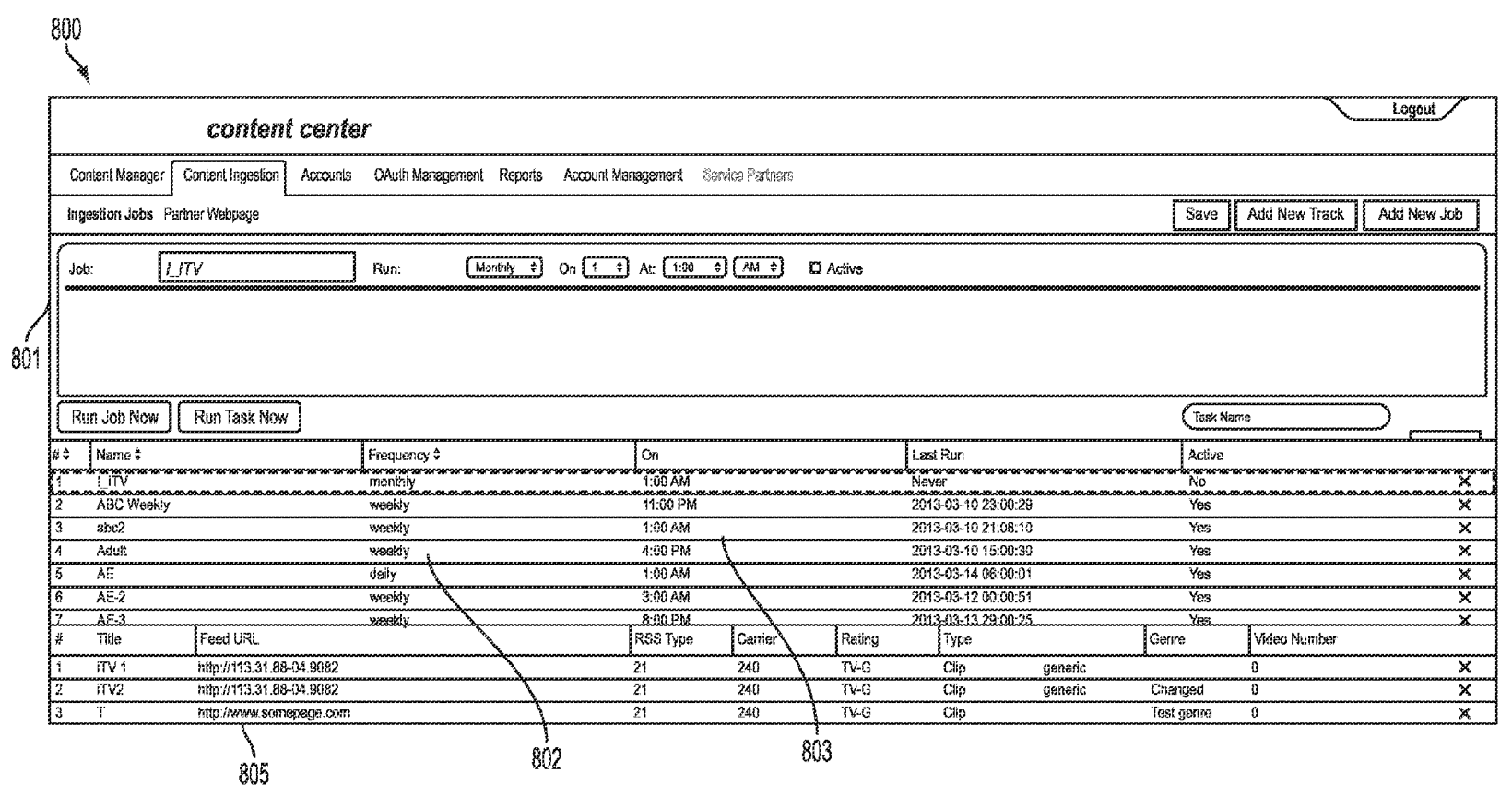

When new content is available from an OTT source as described above, the system may present information about the new content to users via the playlist generation interface. The service provider or its representative may then add the new content to a playlist. In addition or alternatively, to expedite the generation and display of playlists, when the system generates a playlist of available content for any channel, the system may store that playlist in a data storage facility. Periodically, the system may determine whether new content is available for the channel. The system may do this using any suitable means, such as by periodically accessing and analyzing the content available at an OTT source's website, or by receiving a notification from an OTT source via a syndication service or other content feed. If new content is available, the system may add the new content to the playlist and optionally remove older content from the playlist to generate an updated playlist. For example, the system may apply a rule to include a specified number of video assets in the playlist, and when new content is available it will add the new content while removing older content so that only the specified number of assets appears on the first displayed page of the playlist. If new content is not available, or if the system has already identified the new content, then the system may generate the playlist using stored content data for the channel Optionally, the system may include a content ingestion interface by which the service provider may establish criteria for identifying new content from OTT sources. FIG. 8 illustrates an example of a content ingestion interface 800. The content ingestion interface 800 may identify one or more jobs 801 that the system will periodically run to identify new content to be catalogued in the system. For example a job may be to periodically check for new content that is available at a specific video streaming website, or on a subscriber's social media page. Each job may include one or more sources 805 such as website addresses to check, a frequency 802 representing how often the system should run the job, and a start time 803 for each job. The content ingestion criteria also may enable the user to identify one or more screening criteria for new content, so that only new content that satisfies the screening criteria (or that satisfies a score generated as a function of multiple criteria) is added to the system. Such criteria may include, for example, a required title, a minimum run time, a maximum rune time, a genre, and other criteria. The system may allow the system to assign ranks and/or weights to various criteria, so that some criteria take precedence over others when multiple criteria are considered.

In some embodiments, the content ingestion process may ingest content from one or more social media sites using a subscriber's account information for the sites. For example, the system may associate a playlist with the user's social media sites, and it may use content from the user's social media feeds as the video assets for the playlist. In such a case, the system may use the user's login information for the social media sites to connect to the sites and periodically obtain metadata for newly-posted videos posts in the user's feeds. When adding information about the new content to a playlist, the system may use that metadata to identify the content. The service provider may insert additional information about the content, or the system may simply add the content's metadata to the playlist as is. In this way, the service may present a subscriber a "social media channel" comprising a playlist of videos that are posted to the user's social media feeds, in the same package as traditional channels such as television network channels.

Figure 9:
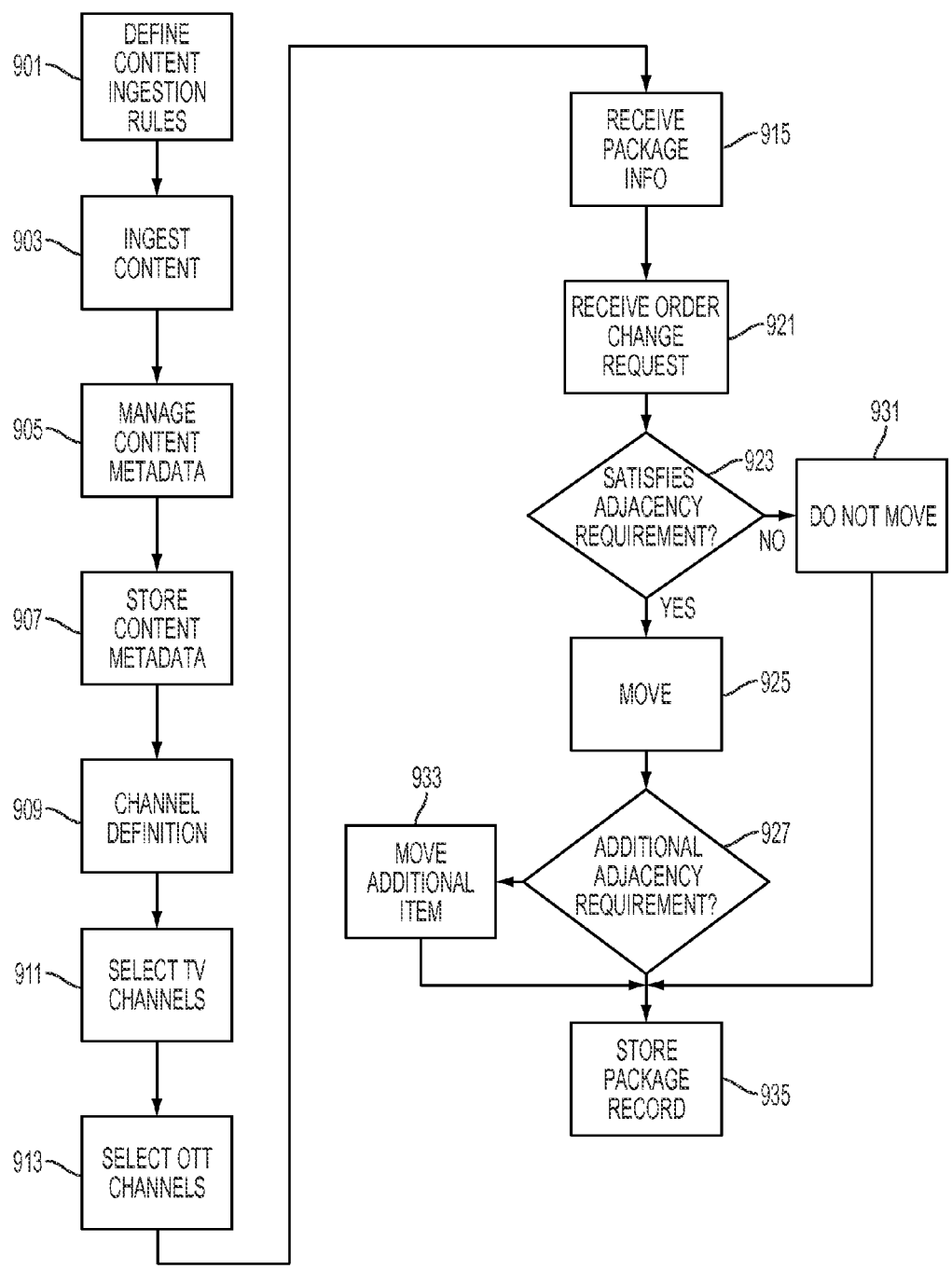
FIG. 9 is a flowchart describing various steps that a content management and delivery system may implement.

FIG. 9 is a flow diagram illustrating various methods that a service provider system may implement. For example, the system may periodically ingest content from one or more OTT content sources 903 by periodically analyzing the source for newly posted video content. The OTT content sources may include video sharing services, video streaming sites, social media feeds, or other sites. The system may select the sources based on system-defined or user-defined content ingestion rules 901 such as a website address to analyze for the content, a frequency of the periodic check, one or more filtering criteria, or other rules. The rules also may associate the source with a playlist of content that will be made available to one or more subscribers, and optionally when a new video is added to the playlist the system may move an older video from a first displayed page of the playlist—or perhaps even remove the older item from the playlist entirely.

When the system identifies new video content, it also retrieves any available metadata about the videos from the source. Examples of metadata may include a title and delivery address. The system also may implement a content management user interface by which a user may add, delete, modify or otherwise manage this metadata 905 for storage in record for the video in a content database 907.

When metadata about various videos becomes available, the system may implement a channel definition interface 909 by which the system may receive user information that defines a channel and/or a playlist of videos to be presented within the channel. The channel definition may include the OTT source, along with a delivery location at which the source presents content that may be viewed on a particular type of viewing device or by a particular device application (such as a video player application). In this way, when a subscriber attempts to access a video, the system will identify the user's device type and/or video player application type and provide the user with a delivery address from which the source presents the video in a format that is compatible with the user's device and/or application. Optionally, the system may store a channel or playlist identifier in association with the content metadata so that the system knows which videos are associated with various channels and playlists.

When various channels are available, the system may implement a package definition interface by which a user may define various packages of channels to offer to subscribers. Through the package definition interface, the system may receive a user selection of a set of traditional television channels 911, along with a set of OTT channels 913, and it may bundle both types of channels in a package definition record 931. Optionally, the system may receive and store other information for the package 915, such as a title, price or other data.

When selecting TV and/or OTT channels, the interface also may permit the user to select an order for the channels for the subscriber package. When the system receives a request to change the order of channels 921, such as a request to move one channel to a package to a new location in the channel sequence, it may determine whether the request satisfies an adjacency requirement. If the request satisfies the adjacency requirement, it may permit and implement the requested move and change to sequence accordingly 925. If not, the system will not implement the requested move 931. In addition, if the move is permitted but the moved channel is subject to an adjacency requirement 927, it will also move an additional item that is linked to the first item by the adjacency requirement 933.

the method further comprises, in response to retrieving the metadata, removing metadata for a prior content item from being associated with the playlist in the data storage facility so that the prior content item will no longer be displayed to a subscriber on a first page of the playlist.

Figure 10:
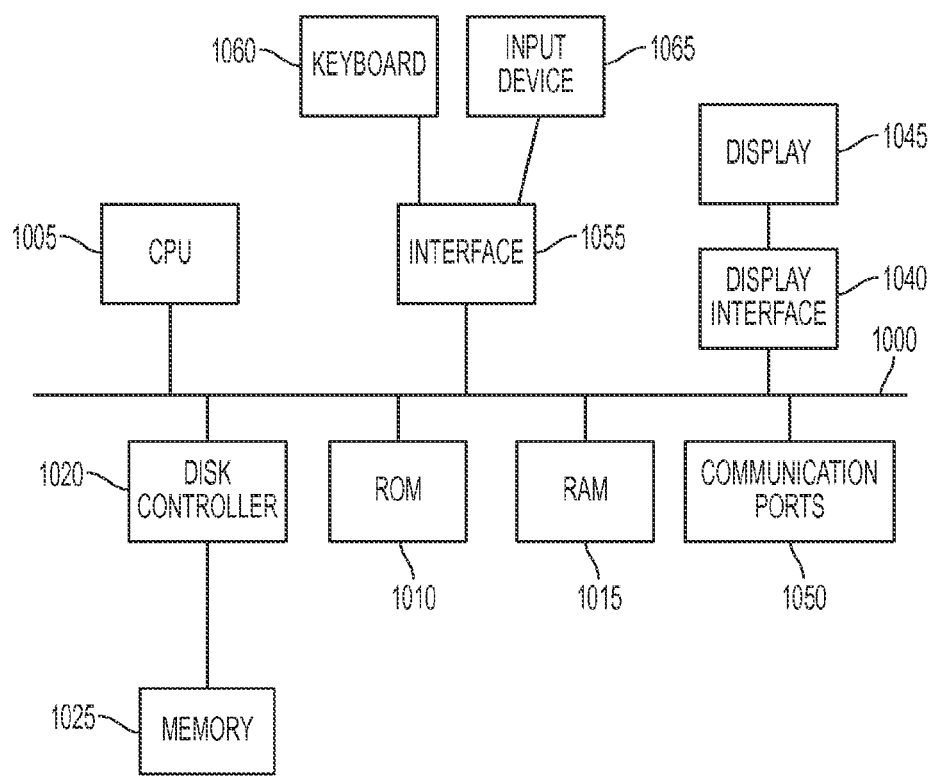
FIG. 10 is a block diagram illustrating various hardware components that may be included in or be used with various elements of integrated content management and delivery systems.

FIG. 10 depicts an example of internal hardware that may be used to contain or implement the various computer processes and systems as discussed above. For example, the user electronic device and/or service provider system as discussed above may include hardware architecture such as that illustrated in FIG. 10. An electrical bus 1000 serves as an information highway interconnecting the other illustrated components of the hardware. CPU 1005 is a central processing unit of the system, performing calculations and logic operations required to execute a program. CPU 1005, alone or in conjunction with one or more of the other elements, is a processing device, computing device or processor as such terms are used within this disclosure. As used in this document and in the claims, the term "processor" may refer to a single processor or any number of processors in a set of processors. Read only memory (ROM) 1010 and random access memory (RAM) 1015 constitute examples of memory devices. Computer-readable media such as these may contain programming instructions that, when executed, cause the processor to perform various functions.

A controller 1020 interfaces with one or more optional memory devices 1025 that service as date storage facilities to the system bus 1000. These memory devices 1025 may include, for example, an external disk drive, a hard drive, flash memory, a USB drive or another type of device that serves as a data storage facility. As indicated previously, these various drives and controllers are optional devices. Additionally, the memory devices 1025 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 1010 and/or the RAM 1015. Optionally, the program instructions may be stored on a non-transitory, computer readable medium such as a compact disk, a digital disk, flash memory, a memory card, a USB drive, an optical disc storage medium, and/or other recording medium.

A display interface 1040 may permit information from the bus 1000 to be displayed on the display 1045 in audio, visual, graphic or alphanumeric format. Communication with external devices may occur using various communication ports 1050. A communication port 1050 may be attached to a communications network, such as the Internet, a local area network or a cellular telephone data network.

The hardware may also include an interface 1055 which allows for receipt of data from input devices such as a keyboard 1060 or other input device 1065 such as a remote control, a pointing device, a video input device and/or an audio input device.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for managing channels of video content from multiple platforms, comprising:
    a data storage facility comprising data for a plurality of available video channels, wherein a portion of video channels are associated with over-the-top video content sources that are not under any control of the service provider;
    a non-transitory computer-readable medium comprising programming instructions that, when executed, cause a processor of a multi-channel video service provider to generate and display a service provider user interface, wherein the programming instructions that cause the processor to generate and display the service provider user interface comprise instructions to:
        receive a service provider selection of one of the sources of over-the-top video content,
        for the selected source, identify a plurality of delivery addresses and associate each of the identified delivery addresses with a subscriber device type,
        define one or more rules for selecting and ordering content from the source in a playlist to be presented via a channel; and
    a content delivery interface configured to present content to a subscriber on the channel in accordance with the defined rules and sourced from the delivery address that is associated with the source of over-the-top video content.

2. The system of claim 1, wherein the programming instructions that enable a service provider to define one or more rules comprise instructions to implement one or more of the following:
    receive an advertisement delivery rule set, wherein the advertisement delivery rule set comprises instructions as to where to place one or more advertisements in the playlist and how many ads to place at any location; or
    adjust one or more filters, wherein each filter assigns a weight to one or more categories of content information, so that when presenting content to the user for selection the system omitting some content based at least one of the user-adjusted filters.

3. The system of claim 1, further comprising:
    a data storage facility also comprising data for a plurality of available video channels that comprise live television network video sources; and
    wherein the instructions further comprise instructions to:
        receive a service provider selection of a plurality of the channels that comprise live television network video sources;
        generate a package comprising the service provider-selected live television network video sources and the service provider-selected sources of over-the-top video content,
        assign a price to the package, and
        offer the package to the subscriber for viewing via the content delivery interface in an integrated platform.

4. The system of claim 1, wherein the programming instructions also comprise instructions to:
    display data relating to the plurality of video channels, wherein a first portion of video channels are video content sources that are controlled by the service provider and a second portion of the video channels are over-the-top video content sources that are not under any control of the service provider,
    receive a selection of a set of video channels from the displayed data, wherein the set includes at least one channel from the first portion and at least one channel from the second portion,
    compile the set of the video channels in a subscriber package, and
    store the package in the data storage facility for offering to a subscriber of content from the service provider.

5. The system of claim 4, wherein:
    the instructions to generate and display the service provider user interface also comprises instructions to generate and display a channel ordering interface by which the service provider may order channels in the subscriber package so that, in operation, the system:
        receives, via the channel ordering interface, a request to move a first channel in the subscriber package to a new order location in the subscriber package;
        identifies an adjacency rule that applies to the first channel and one or more channels that would be adjacent to the first channel if the first channel were moved to the new order location; and
        permits movement of the first channel to the new location only if the movement would satisfy the adjacency rule.

6. The system of claim 4, further comprising, by a processor, presenting a channel definition interface configured to enable the service provider to define a new channel or modify an existing channel so that, in operation, the system:
receives a selection one or more sources of over-the-top video content;
for each source, associates a delivery address with a subscriber device type; and
defines one or more rules for selecting and ordering content from the one or more sources in a playlist to be presented via the new channel; and
when content is presented to a subscriber on the associated channel, offers the content to the subscriber in accordance with the defined rules and sourced from the delivery address that is associated with the source of over-the-top video content.

7. The system of claim 6, further comprising additional programming instructions such that in operation cause the system:
receive, from the channel definition interface, a user definition of an advertisement delivery rule set, wherein the advertisement delivery rule set comprises instructions as to where to place one or more advertisements in the playlist and how many ads to place at any location; and
when presenting content to a subscriber on the associated channel, place one or more advertisements in the playlist in accordance with the advertisement delivery rule set.

8. The system of claim 6, further comprising additional programming instructions such that, in operation, cause the system to:
present, via the channel definition interface, a plurality of user-selectable filters, wherein each filter assigns a weight to one or more categories of content information;
receive a user-selected adjustment of one or more of the filters; and
when presenting content to the user for selection omits some content based at least one of the user-adjusted filters.

9. The system of claim 4, further comprising additional programming instructions that, when executed, cause a processor presenting a content management interface configured to enable the service provider to manage available content so that, in operation, the system:
receives a user selection of a content item;
retrieves metadata associated with the content item, wherein the metadata comprises a title and a delivery address;
receives, via the content management interface, descriptive information of the content item; and
saves the metadata and descriptive information as a record of the content item.

10. The system of claim 4, further comprising additional programming instructions that, when executed, cause a processor to present a content management interface configured to enable the service provider to manage available content so that, in operation, the system:
presents a content management interface configured to enable the service provider to manage available content
receives a user selection of a video source;
receives a rule set comprising a frequency;
periodically accesses the video source according to the frequency to determine whether the video source has posted any new content since a prior time that the processor accessed the video source;
retrieves metadata for the new content, wherein the metadata comprises a title and a delivery address; and
stores the metadata in a content data storage facility.

11. The system of claim 10, wherein the content management device is configured to:
enable the video source to corresponds to a social media feed for a subscriber;
enable the service provider to periodically accesses the video source by accessing the subscriber's social media feed and retrieves metadata for new posts to the subscriber's social media feed; and
automatically add the new content to a playlist that is presented to the subscriber in the package as a channel from the second portion.

12. The system of claim 10, wherein the content management device is configured to:
enable the video source corresponds to a playlist of content;
store the metadata in association with the playlist; and
remove the metadata, in response to retrieving the metadata, for a prior content item from being associated with the playlist in the data storage facility so that the prior content item will no longer be displayed to a subscriber on a first page of the playlist.

13. A method for managing channels for delivery of video content from multiple platforms, the method comprising:
storing, on a non-transitory computer readable medium, data for a plurality of available video channels, wherein a portion of video channels are associated with over-the-top video content sources that are not under any control of the service provider;
generating and displaying, by a multi-channel video service provider, a user interface by:
receiving a service provider selection of one or the sources of over-the-top video content,
identifying, for the selected source, a plurality of deliver addresses and associating each of the identified delivery addresses with a subscriber device type,
defining one or more rules for selecting and ordering content from the source in a playlist to be presented via a channel; and
presenting, by a content delivery interface, content to a subscriber on the channel in accordance with the defined rules and sourced from the delivery address that is associated with the source of over-the-top video content.

14. The method of claim 13, wherein the defining one or more rules comprises one or more of the following:
receiving an advertisement delivery rule set, wherein the advertisement delivery rule set comprises instructions as to where to place one or more advertisements in the playlist and how many ads to place at any location; or
adjusting one or more filers, wherein each filter assigns a weight to one or more categories of content information, so that that when presenting content to the user for selection the system omitting some content based at least one of the user-adjusted filters.

15. The method of claim 13, further comprising:
storing, on a non-transitory computer readable medium, data for a plurality of available video channels comprising live television network video sources;
receiving a service provider selection of a plurality of the channels comprising live television network video sources;
generating a package comprising the service provider-selected live television network video sources and the service provider-selected sources of over-the-top video content,
assigning a price to the package, and
offering the package to the subscriber for viewing via the content delivery interface in an integrated platform.

16. The method of claim 13, further comprising:
displaying data relating to the plurality of video channels, wherein a first portion of video channels are video content sources that are controlled by the service provider and a second portion of the video channels are over-the-top video content sources that are not under any control of the service provider,
receiving a selection of a set of video channels from the displayed data, wherein the set includes at least one channel from the first portion and at least one channel from the second portion,
compiling the set of the video channels in a subscriber package, and
storing the package in the data storage facility for offering to a subscriber of content from the service provider.

17. The method of claim 16, further comprising:
generating and displaying a channel ordering interface by which the service provider may order channels in the subscriber package by:
receiving, via the channel ordering interface, a request to move a first channel in the subscriber package to a new order location in the subscriber package;
identifying an adjacency rule that applies to the first channel and one or more channels that would be adjacent to the first channel if the first channel were moved to the new order location; and
permitting movement of the first channel to the new location only if the movement would satisfy the adjacency rule.

18. The method of claim 16, further comprising, by a processor, presenting a channel definition interface configured to enable the service provider to define a new channel or modify an existing channel by:
receiving a selection one or more sources of over-the-top video content;
for each source, associating a delivery address with a subscriber device type;
defining one or more rules for selecting and ordering content from the one or more sources in a playlist to be presented via the new channel; and
when content is presented to a subscriber on the associated channel, offering the content to the subscriber in accordance with the defined rules and sourced from the delivery address that is associated with the source of over-the-top video content.

19. The method of claim 18, further comprising:
receiving, from the channel definition interface, a user definition of an advertisement delivery rule set, wherein the advertisement delivery rule set comprises instructions as to where to place one or more advertisements in the playlist and how many ads to place at any location; and
when presenting content to a subscriber on the associated channel, placing one or more advertisements in the playlist in accordance with the advertisement delivery rule set.

20. The method of claim 18, further comprising:
presenting, via the channel definition interface, a plurality of user-selectable filters, wherein each filter assigns a weight to one or more categories of content information;
receiving a user-selected adjustment of one or more of the filters; and
when presenting content to the user for selection omitting some content based at least one of the user-adjusted filters.

21. The method of claim 16, further comprising, by a processor, presenting a content management interface configured to enable the service provider to manage available content by:
receiving a user selection of a content item;
retrieving metadata associated with the content item, wherein the metadata comprises a title and a delivery address;
receiving, via the content management interface, descriptive information of the content item; and
saving the metadata and descriptive information as a record of the content item.

22. The method of claim 16, further comprising, by a processor, presenting a content management interface configured to enable the service provider to manage available content by:
receiving a user selection of a video source;
receiving a rule set comprising a frequency;
periodically accessing the video source according to the frequency to determine whether the video source has posted any new content since a prior time that the processor accessed the video source;
retrieving metadata for the new content, wherein the metadata comprises a title and a delivery address; and
storing the metadata in a content data storage facility.

23. The method of claim 22, wherein:
the video source corresponds to a social media feed for a subscriber; and
periodically accessing the video source comprises accessing the subscriber's social media feed and retrieving metadata for new posts to the subscriber's social media feed; and
the method further comprises automatically adding the new content to a playlist that is presented to the subscriber in the package as a channel from the second portion.

24. The method of claim 22, wherein:
the video source corresponds to a playlist of content; and
storing the metadata comprises storing the metadata in association with the playlist; and
the method further comprises, in response to retrieving the metadata, removing metadata for a prior content item from being associated with the playlist in the data storage facility so that the prior content item will no longer be displayed to a subscriber on a first page of the playlist.

* * * * *

UNITED STATES PATENT AND TRADEMARK OFFICE
CERTIFICATE OF CORRECTION

| | | |
|---|---|---|
| PATENT NO. | : 9,027,065 B2 | |
| APPLICATION NO. | : 14/218285 | |
| DATED | : May 5, 2015 | |
| INVENTOR(S) | : Earle | |

It is certified that error appears in the above-identified patent and that said Letters Patent is hereby corrected as shown below:

In the claims

Column 13 & 14 line 46-5 claim 1, should read

1. A system for managing channels of video content from multiple platforms, comprising:

a data storage facility comprising data for a plurality of available video channels, wherein a portion of video channels are associated with over-the-top video content sources that are not under any control of the a service provider;

a non-transitory computer-readable medium comprising programming instructions that, when executed, cause a processor of a multi-channel video service provider to generate and display a service provider user interface, wherein the programming instructions that cause the processor to generate and display the service provider user interface comprise instructions to:

receive a service provider selection of one of the sources of over-the-top video content, for the selected source, identify a plurality of delivery addresses and associate each of the identified delivery addresses with a subscriber device type, define one or more rules for selecting and ordering content from the source in a playlist to be presented via a channel; and Signed and Sealed this
Eighth Day of March, 2016

Michelle K. Lee
*Director of the United States Patent and Trademark Office* a content delivery interface configured to present content to a subscriber on the channel in accordance with the defined rules and sourced from the delivery address that is associated with the source of over-the-top video content.

Column 14 line 6-18 claim 2, should read

2. The system of claim 1, wherein the programming instructions that enable a service provider to define one or more rules comprise instructions to implement one or more of the following:

receive an advertisement delivery rule set, wherein the advertisement delivery rule set comprises instructions as to where to place one or more advertisements in the playlist and how many ads to place at any location; or adjust one or more filters, wherein each filter assigns a weight to one or more categories of content information, so that when presenting content to the user for selection the system omits some content based at least one of the adjusted filters.

Column 15 line 50-64 claim 10, should read

10. The system of claim 4, further comprising additional programming instructions that, when executed, cause a processor to present a content management interface configured to enable the service provider to manage available content so that, in operation, the system:

presents a content management interface configured to enable the service provider to manage available content;

receives a user selection of a video source;

receives a rule set comprising a frequency;

periodically accesses the video source according to the frequency to determine whether the video source has posted any new content since a prior time that the processor accessed the video source;

retrieves metadata for the new content, wherein the metadata comprises a title and a delivery address; and stores the metadata in a content data storage facility.

Column 16 line 21-43 claim 13, should read

13. A method for managing channels for delivery of video content from multiple platforms, the method comprising:

storing, on a non-transitory computer readable medium, data for a plurality of available video channels, wherein a portion of video channels are associated with over-the-top video content sources that are not under any control of a service provider;

generating and displaying, by a multi-channel video service provider, a user interface by:

receiving a service provider selection of one or the sources of over-the-top video content, identifying, for the selected source, a plurality of deliver addresses and associating each of the identified delivery addresses with a subscriber device type, defining one or more rules for selecting and ordering content from the source in a playlist to be presented via a channel; and presenting, by a content delivery interface, content to a subscriber on the channel in accordance with the defined rules and sourced from the delivery address that is associated with the source of over-the-top video content.

Column 16 line 43-53 claim 14, should read

14. The method of claim 13, wherein the defining one or more rules comprises one or more of the following:

receiving an advertisement delivery rule set, wherein the advertisement delivery rule set comprises instructions as to where to place one or more advertisements in the playlist and how many ads to place at any location; or adjusting one or more filers, wherein each filter assigns a weight to one or more categories of content information, so that that when presenting content to the user for selection the system omits some content based at least one of the adjusted filters.